United States Patent
Lee (10) Patent No.: US 7,216,215 B2
(45) Date of Patent: May 8, 2007

(54) DATA ACCESS METHOD APPLICABLE TO VARIOUS PLATFORMS

(75) Inventor: Scott Lee, Taipei (TW)

(73) Assignee: Via Technologies, Inc., Taipei (TW)

( * ) Notice: Subject to any disclaimer, the term of this patent is extended or adjusted under 35 U.S.C. 154(b) by 338 days.

(21) Appl. No.: 10/693,612

(22) Filed: Oct. 24, 2003

(65) Prior Publication Data

US 2004/0128467 A1    Jul. 1, 2004

(30) Foreign Application Priority Data

Oct. 25, 2002    (TW) ............................... 91125180 A (51) Int. Cl.
*G06F 12/06* (2006.01)
*G06F 9/315* (2006.01)
(52) U.S. Cl. .................. 711/219; 365/240; 365/189.12
(58) Field of Classification Search ..................... None
See application file for complete search history.

(56) References Cited

U.S. PATENT DOCUMENTS

| | | | | |
|---|---|---|---|---|
| 4,814,976 | A * | 3/1989 | Hansen et al. | 711/201 |
| 5,410,682 | A * | 4/1995 | Sites et al. | 712/300 |
| 5,517,512 | A * | 5/1996 | Saegusa | 714/759 |
| 6,721,866 | B2 * | 4/2004 | Roussel et al. | 711/201 |
| 6,820,186 | B2 * | 11/2004 | Webber et al. | 711/219 |
| 6,820,195 | B1 * | 11/2004 | Shepherd | 712/300 |
| 2003/0084082 | A1 * | 5/2003 | Debes et al. | 708/420 |
| 2004/0098556 | A1 * | 5/2004 | Buxton et al. | 711/201 |
| 2004/0215928 | A1 * | 10/2004 | Beaumont | 712/14 |

* cited by examiner

*Primary Examiner*—B. James Peikari (57) ABSTRACT

A data access method uses variable mask data and shift amount to write data into or read data from a data storage zone. The mask data and shift amount are determined according to starting and end data bit addresses in a bit range of the data to be read or written. Therefore, the data access method is applicable to various platforms with various byte endians.

18 Claims, 10 Drawing Sheets

DATA ACCESS METHOD APPLICABLE TO VARIOUS PLATFORMS

FIELD OF THE INVENTION

The present invention relates to a data access method, and more particular to a data access method applicable to various platforms.

BACKGROUND OF THE INVENTION

In a digital data processing system such as a computer system or a network communication system, some specific digital data such as common parameters, control data or addresses are generally stored together in a designated data storage zone to be referred when required and to save storage space of the memory. The data format of the designated data storage zone can be an array for successively storing a plurality of data bytes.

Figure 1:
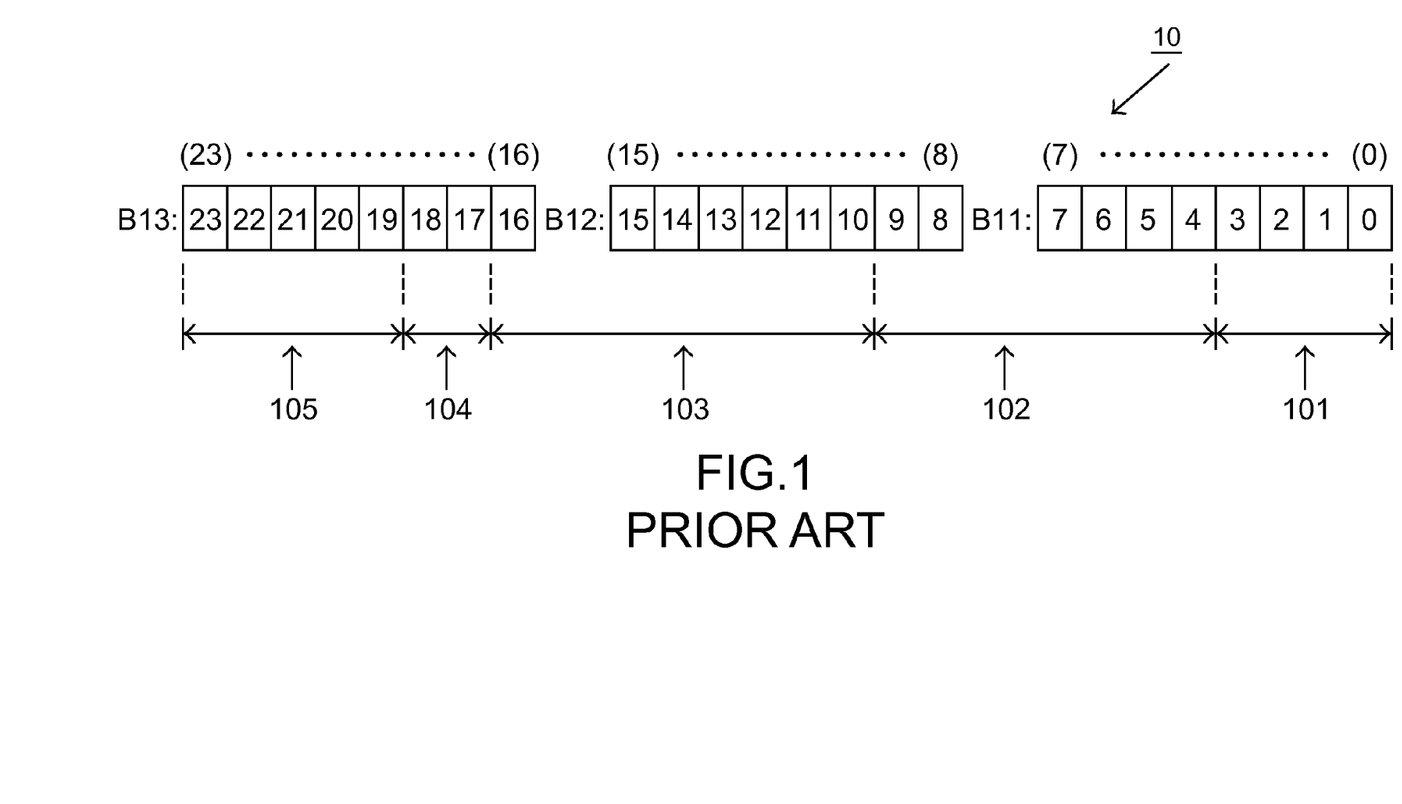
FIG. 1 is a schematic diagram showing the storage of data in a data storage zone according to a prior art.

Please refer to FIG. 1 which schematically shows the data storage zone 10 and three data bytes B11, B12 and B13 stored in the data storage zone 10. Each of the data bytes B11, B12 and B13 includes 8 bits, and thus there are 24 bits (numbers 0~23) stored in corresponding addresses (0)~(23) in the data storage zone 10.

In practical, the 24 bits are divided into 5 columns 101~105 for respectively storing 5 sets of different bit data. For example, there are four bits 0~3 in the first column 101, six bits 4~9 in the second column 102, seven bits 10~16 in the third column 103, two bits 17~18 in the fourth column 104, and five bits 19~23 in the fifth column 105.

Since the digital processing system stores data byte by byte, the 5 sets of bit data in columns 101~105 should be properly shifted and operated to be successfully accessed. For example, Bit data in column 101=data byte B11 & 0x0F;
Bit data in column 102=((data byte B12 & 0x03)<<4)|
 ((data byte B11 & 0xF0)>>4);
Bit data in column 103=((data byte B13 & 0x01)<<6)|
 ((data byte B12 & 0xFC)>>2);
Bit data in column 104=(data byte B13 & 0x06)>>1; and
Bit data in column 105=(data byte B13 & 0xF8) 3;

wherein each of the expressions "0x0F", "0x03","0xF0", "0x01","0xFC", "0x06" and "0xF8" indicates an 8-bit hexadecimal mask data, the expression "X & Y" indicates an AND gate logic operation of X with Y, the expression "X|Y" indicates an OR gate logic operation of X with Y, the expression "X>>Y" indicates the rightward shift of the data X by Y bits and the expression "X<<Y" indicates the leftward shift of the data X by Y bits.

In the above processing method, the mask data and shift amounts are preset and constant. When the bit specifications in the columns are rearranged, the mask data and shift amounts will be unable to be adjusted accordingly. Therefore, the bit data cannot be accessed correctly. Conventionally, these data have to be adjusted manually at the time the specification changes.

In order to solve this problem, the processing method is operated with bits as basic units in another prior art. Giving the five columns 101~105 mentioned above as an example, the five columns 101~105 are adjacent to one another, and respective bit numbers required by the five columns 101~105 are determined. Afterwards, when the data in the columns are being accessed, the mask data and shift amounts are not required any longer. In stead, the bit ranges of the columns should be defined in advance, and then the columns are independently accessed. For example, the data storage zone 10 has a format of structural array, and the bit numbers of the sequentially adjacent columns 101~105 are defined as follows:

Bit data in column 101 includes 4 bits;
Bit data in column 102 includes 6 bits;
Bit data in column 103 includes 7 bits;
Bit data in column 104 includes 2 bits; and
Bit data in column 105 includes 5 bits.

Figure 2A:
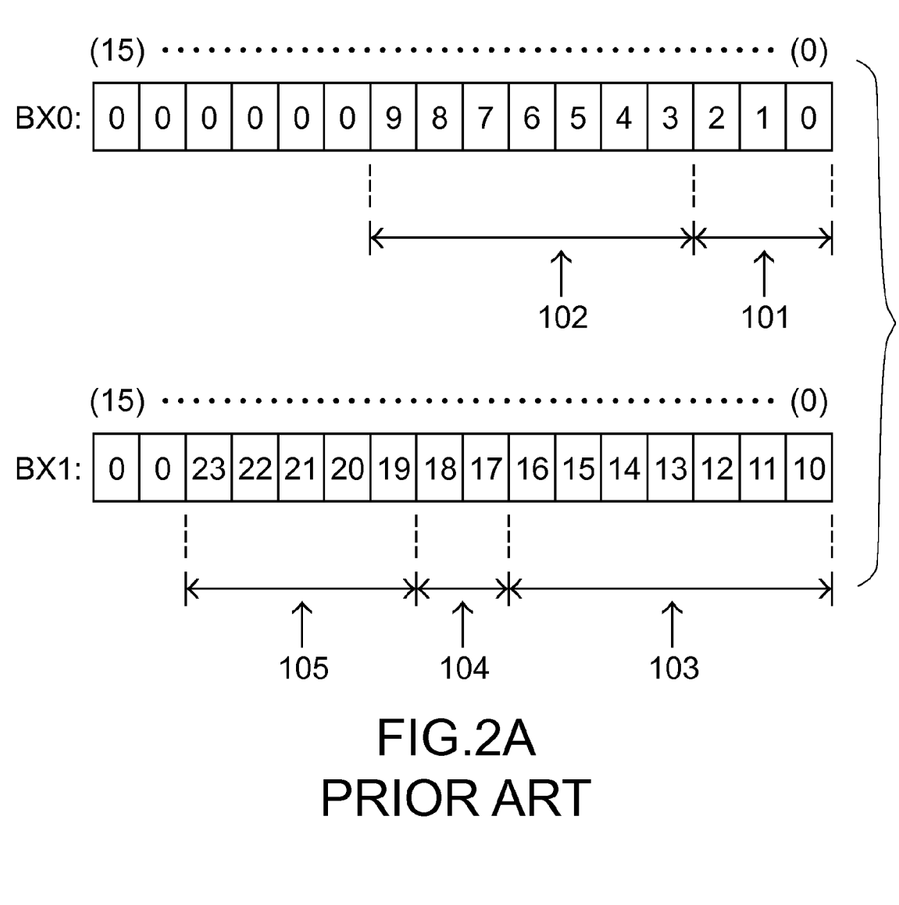
FIGS. 2A~2C are schematic diagrams showing the storage of data in a data storage zone according to another prior art.

This method, however, is performed logically. In practice, the digital processing system does not provide any real and continuous memory block for the bit data to be stored as immediately adjacent columns. The data, in stead, have to be stored according to the basic storage format of the system. For example, as shown in FIG. 2A, the basic storage format of the system is two bytes (16 bits) stored in corresponding addresses (0)~(15) in the data storage zone 10. As described above, the bit data in columns 101, 102 and 103 are 4, 6, and 7 bits, respectively. Therefore, the storage of the bit data in the third column 103 is beyond the basic storage capacity, i.e. 16 bits. In other words, only the data in the first and the second columns can be stored in the same basic storage unit, e.g. the basic storage unit BX0, and the data in the other columns 103, 104 and 105 have to be stored in another 16-bit basic storage unit BX1. It is obvious that there will be 6-bit clearance between the column 102 and column 103, so the columns are not adjacent to each other. This might render errors in the subsequent accessing procedures.

Figure 2B:
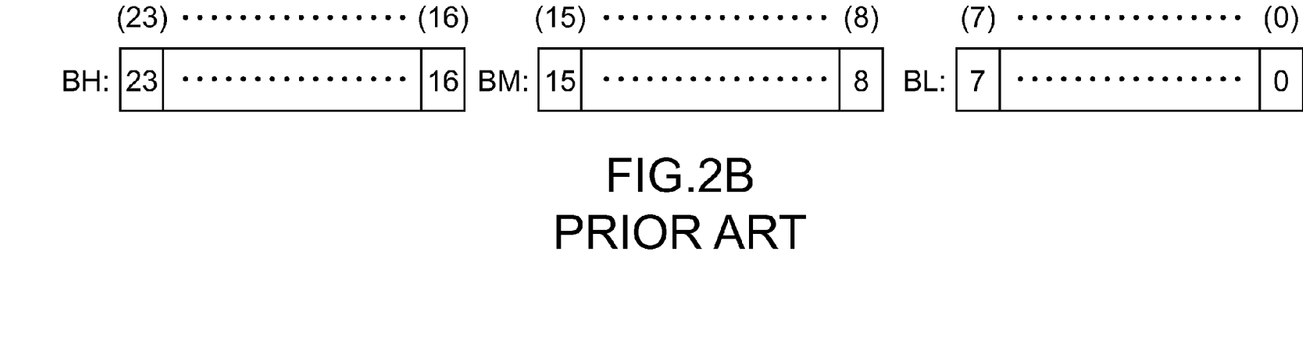
Figure 2C:
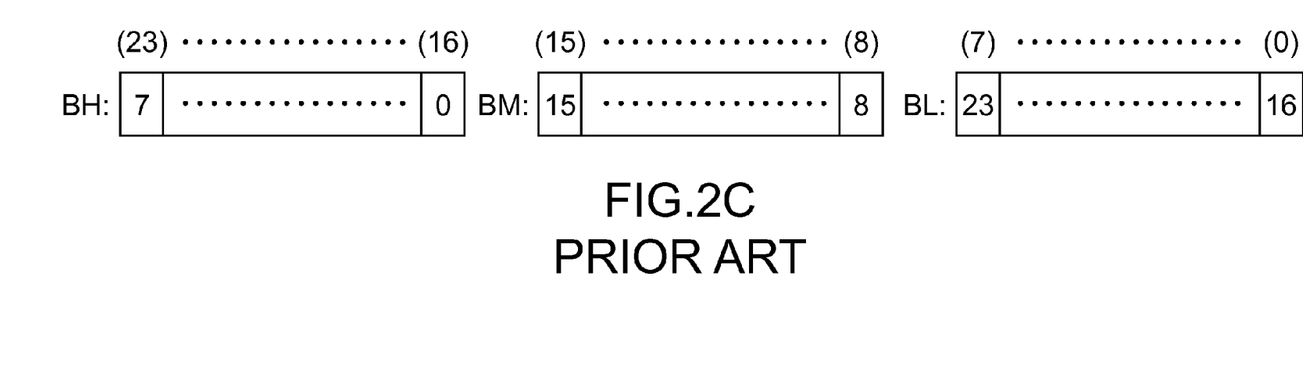

Further, for different systems or platforms, their endians also differ from one another. Giving a system incorporating an 80x86 CPU as an example, the arrangement shown in FIG. 2B is referred to as "little endian", i.e. the lower bit data are stored in lower bit addresses. In FIG. 2B, three basic storage units BL, BM and BH comprise bits 0~7, 8~15 and 16~23 stored in addresses (0)~(7), (8)~(15) and (16)~(23), respectively. On the other hand, the arrangement shown in FIG. 2C is referred to as "big endian", i.e. the lower bit data are stored in higher bit addresses. In FIG. 2C, three basic storage units BL, BM and BH comprise bits 0~7, 8~15 and 16~23 stored in addresses (16)~(23), (8)~(15) and (0)~(7), respectively.

It is understood from the above description that different platforms, e.g. systems with different endians, requires different processing methods. Otherwise, the bit data will not be able to be correctly accessed.

SUMMARY OF THE INVENTION

Therefore, it is an object of the present invention to provide a data access method applicable to various platforms with different endians.

A first aspect of the present invention relates to a data access method, comprising a data reading procedure to read a certain bit range of data from a data storage zone. The certain bit range is stored in the data storage zone from a starting bit address (a) to an end bit address (b). The data reading procedure comprises steps of: performing a first operation of the starting bit address (a) to obtain a first shift S1; performing a second operation of the starting bit address (a) to obtain a second shift S2; performing a first shift operation of the data with the first shift S1 to obtain a first shifted data unit; performing a second shift operation of the data with the second shift S2 to obtain a second shifted data unit; and synthesizing the first and the second shifted data units to obtain a read data unit.

In one embodiment, the data storage zone stores data as at least one data unit consisting of m bits, and the bit range consists of n bits, where n is greater than m.

In one embodiment, the first and the second operations are performed by the following formulae:

$$S1 = \mathrm{mod}[a, m]; \text{ and}$$

$$S2 = m - \mathrm{mod}[a, m] \times m - S1,$$

where mod [a, m] is the remainder on division of a by m.

In one embodiment, the first shift operation is performed by shifting a first data unit of the data to be read toward one of the higher bit direction and the lower bit direction, and the second shift operation is performed by shifting a second data unit of the data to be read toward the other of the higher bit direction and the lower bit direction.

Preferably, the second data unit is immediately adjacent to the first data unit in the data storage zone.

Preferably, the first and the second shift operations are further performed on subsequent data units until a data unit comprising the end data bit address (b) has been shifted to obtain a last shifted data unit.

Moreover, the data access method further comprises a step of masking the last shifted data unit with a mask data MD for clearing bits excluded from the bit range, where MD=0xFF>>(m−(b−a+1)), the expression "0xFF" indicates an 8-bit hexadecimal mask data and the 8 bits are all "1", and the expression "X>>Y" indicates the rightward shift of the data X by Y bits.

In one embodiment, the first and the second shifted data units are synthesized via an OR gate operation.

A second aspect of the present invention relates to a data access method, comprising a data writing procedure to write a certain bit range of data into a data storage zone. The certain bit range is stored into the data storage zone from a starting bit address (a) to an end bit address (b). The data writing procedure comprises steps of: performing a first operation of the starting bit address (a) to obtain a first shift S3; performing a second operation of the starting bit address (a) to obtain a second shift S4; performing a first shift operation of the data with the first shift S3 to obtain a first shifted data unit; performing a second shift operation of the data with the second shift S4 to obtain a second shifted data unit; and synthesizing the first and the second shifted data units to obtain a written data unit.

In one embodiment, the data storage zone stores data as at least one data unit consisting of m bits, and the bit range consists of n bits, where n is greater than m.

In one embodiment, the first and the second operations are performed by the following formulae:

$$S3 = \mathrm{mod}[a, m]; \text{ and}$$

$$S4 = m - \mathrm{mod}[a, m] = m - S3,$$

where mod [a, m] is the remainder on division of a by m.

In one embodiment, the first shift operation is performed by shifting a first data unit of the data to be written toward one of the higher bit direction and the lower bit direction, and the second shift operation is performed by shifting a second data unit of the data to be written toward the other of the higher bit direction and the lower bit direction. The second data unit is immediately adjacent to the first data unit in the data storage zone.

Preferably, the data access method further comprises before the first and the shifting operations steps of: determining whether the second data unit is the last data unit of the data to be written; and masking the second data unit with a mask data MD3 for clearing bits excluded from the bit range when the second data unit is the last data unit of the data to be written, where MD3=0xFF<<(mod[b, m]+1), mod [b, m] is the remainder on division of b by m, the expression "0xFF" indicates an 8-bit hexadecimal mask data and the 8 bits are all "1", and the expression "X<<Y" indicates the leftward shift of the data X by Y bits.

Preferably, the data access method further comprises steps of: performing a third shifting operation of a starting data unit of the data to be written with the first shift S3; and masking the staring data unit with a mask data MD2 for clearing bits excluded from the bit range, where MD2=~(0xFF<<S3), the expression "0xFF" indicates an 8-bit hexadecimal mask data and the 8 bits are all "1", the expression "X<<Y" indicates the leftward shift of the data X by Y bits, and the expression "~Z" indicates the reverse logic operation of data Z.

In one embodiment, the first and the second shifted data units are synthesized via an OR gate operation.

According to a third aspect of the present invention, a data access method comprises a data writing procedure to write a certain bit range of data into a data storage zone. The data storage zone stores data as at least one data unit consisting of m bits. The certain bit range consists of n bits and is stored into the data storage zone from a starting bit address (a) to an end bit address (b). The data writing procedure comprising steps of: performing a first operation of the starting bit address (a) and the bit number m to obtain a first shift S3; performing a second operation of the starting bit address (a) and the bit number m to obtain a second shift S4; performing a first clear and writing procedure of the data to be written when n is no greater than m, the first clear and writing procedure comprising a step of masking the data to be written with a first mask data MD1=~((0xFF>>((m−1)−b+a))<<S3); performing a second clear and writing procedure of the data to be written when n is greater than m, the second clear and writing procedure comprising a step of masking the starting data unit of the data to be written with a second mask data MD2=~(0xFF<<S3); performing a third clear and writing procedure of the data to be written when n is greater than m, the third clear and writing procedure comprising a step of masking the end data unit of the data to be written with a third mask data MD3=0xFF<<(mod[b, m]+1); and performing a first and a second shift operations of the data with the first and the second shifts S3 and S4 to obtain a first and a second shifted data units, and synthesizing the first and the second shifted data units to obtain a written data unit when n is greater than m. The expression "0xFF" indicates a hexadecimal mask data, the expression "X>>Y" indicates the rightward shift of the data X by Y bits, the expression "X<<Y" indicates the leftward shift of the data X by Y bits, the expression "~Z" indicates the reverse logic operation of data Z, the expression "X & Y" indicates AND gate operation of data X and Y, and the expression "mod [b, m]" indicates the remainder on division of b by m.

The data writing procedure can be performed as little endian or big endian according to the applied platform.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 3:
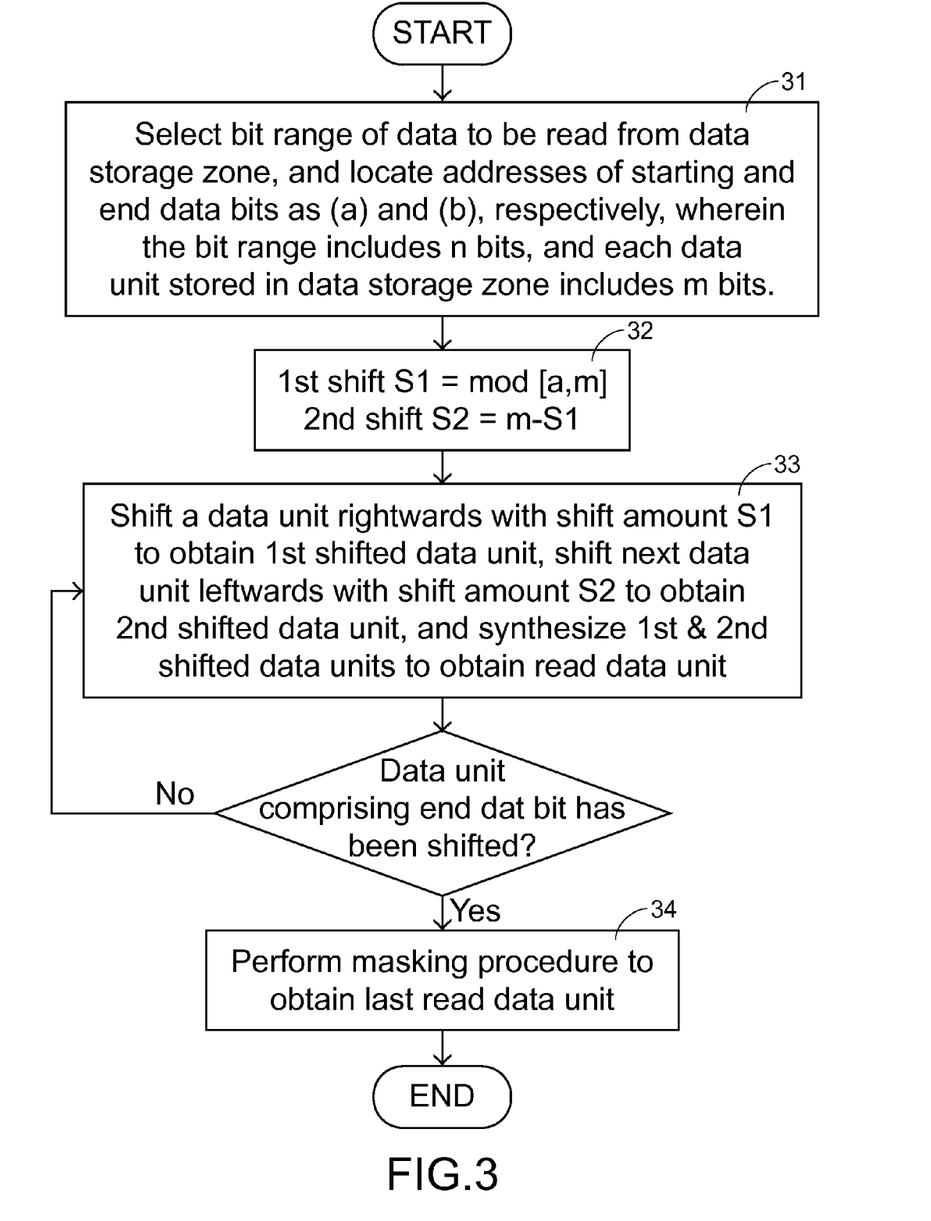
FIG. 3 is a flowchart illustrating an embodiment of a data reading procedure of the digital access method according to the present invention.

A preferred embodiment of a data access method according to the present invention is illustrated with reference to the flowchart of FIG. 3. Herein, the reading procedure of the data access method is first illustrated. First of all, the bit range of the data to be read from the data storage zone is selected (Step 31), which for example, consists of n bits. The data storage zone stores a plurality of data units as an array structure, wherein each data unit consists of m bits. The addresses (a)~(b) of the bit range of the data is then properly shifted according to desired addresses, e.g. (0)~(c), where b=a+n−1 and c=n−1. A first shift S1 and a second shift S2 are determined based on the address (a) of the starting data bit of the bit range (Step 32). The first shift S1 is calculated by a formula S1=mod [a, m], were mod [a, m] is the remainder on division of a by m, and the second shift S2 is calculated by a formula S2=m−S1. For example, if a byte consisting of 8 bits is used as the data unit, S1=mod[a, 8] and S2=8−S1.

All the m bits of a first data unit associated with the data to be read are shifted rightwards by the amount of the first shift S1 to obtain a first shifted data unit. On the other hand, all the m bits of a second data unit immediately adjacent to the first data unit and associated with the data to be read are shifted leftwards by the amount of the second shift S2 to obtain a second shifted data unit. The first and the second data units, for example, include lower and higher bits, respectively. The first and the second shifted data units are then synthesized to obtain a first read data unit via an OR gate operation (Step 33). If the bit range involves more than two data units, Step 33 is repetitively performed for subsequent data units until the end data bit of the bit range has been processed by the shifting operation. Meanwhile, a plurality of read data units are obtained.

After the data unit including the end data bit of the bit range has been rightward shifted by the amount of the first shift S1, a masking procedure is performed to clear the data bit(s) excluded from the bit range of the data to be read. Then, the last read data unit can be obtained (Step 34). The combined read data units result in the desired bit range addressed from address (0) to address (n−1) consecutively.

As for the masking procedure, it will be described herein on the condition that each data unit includes 8 bits, i.e. m=8. The mask data MD used in the masking procedure is defined as:

$$MD = 0xFF >> (8-(b-a+1)),$$

where the expression "0xFF" indicates an 8-bit hexadecimal mask data and the 8 bits are all "1", and the expression "X>>Y" indicates the rightward shift of the data X by Y bits.

Figure 4A:
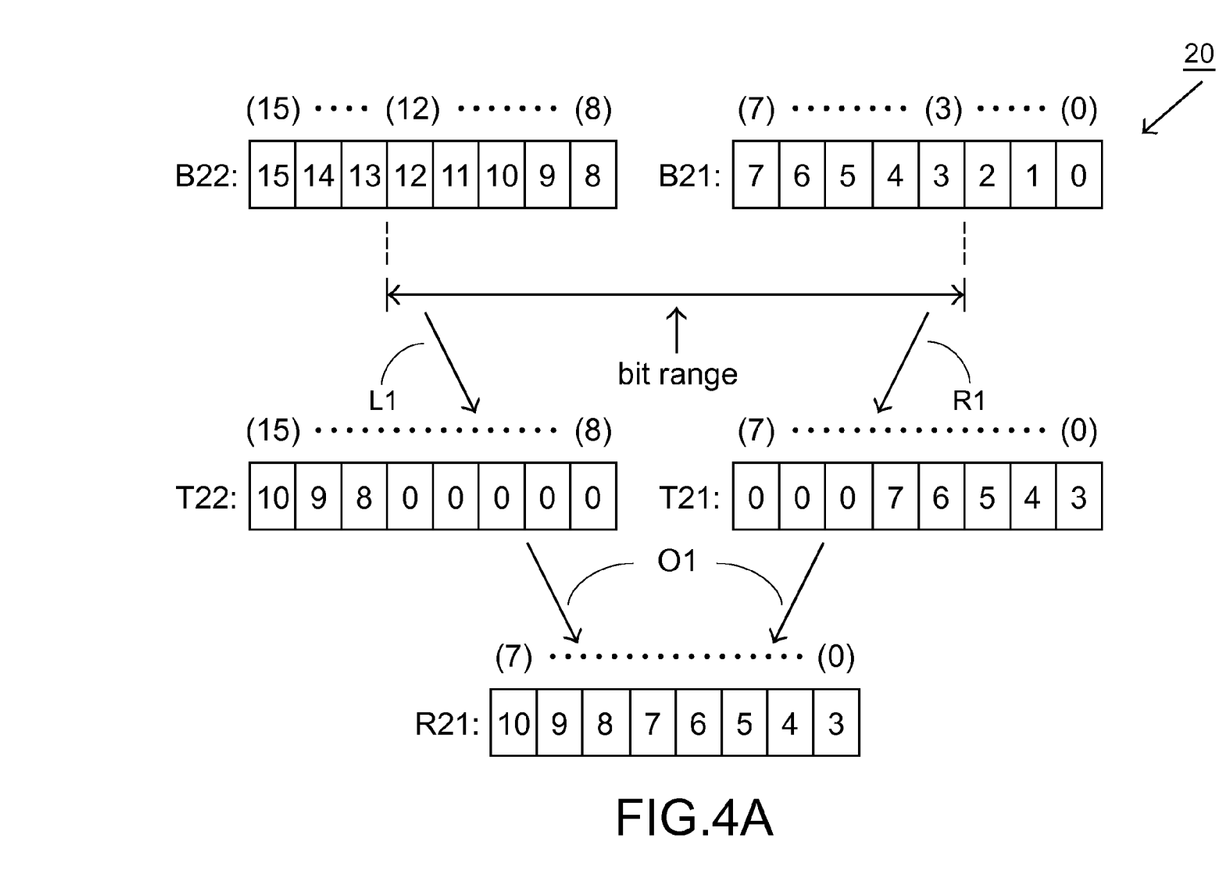
FIGS. 4A~4C are schematic diagrams showing the storage of data in a data storage zone according to the embodiment of FIG. 3.
Figure 4B:
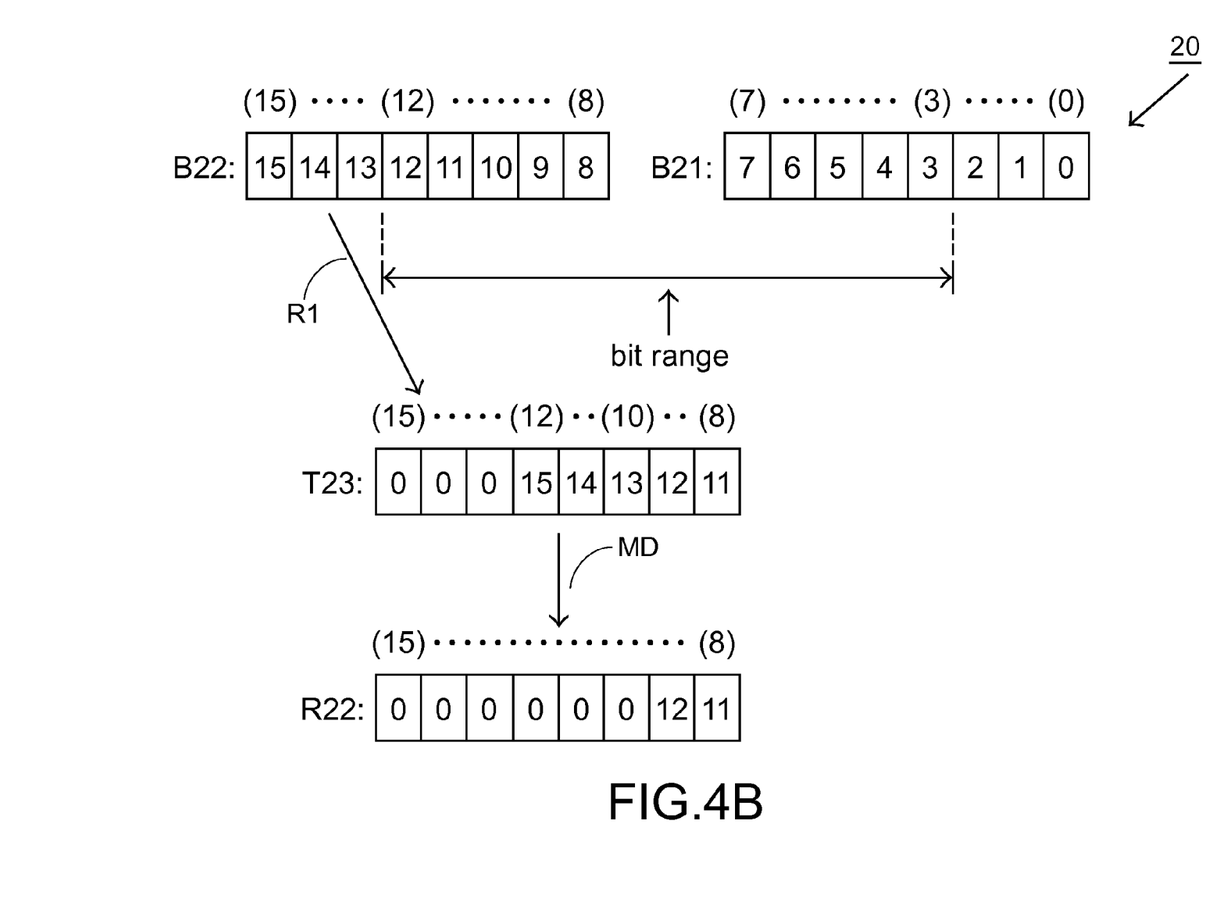
Figure 4C:
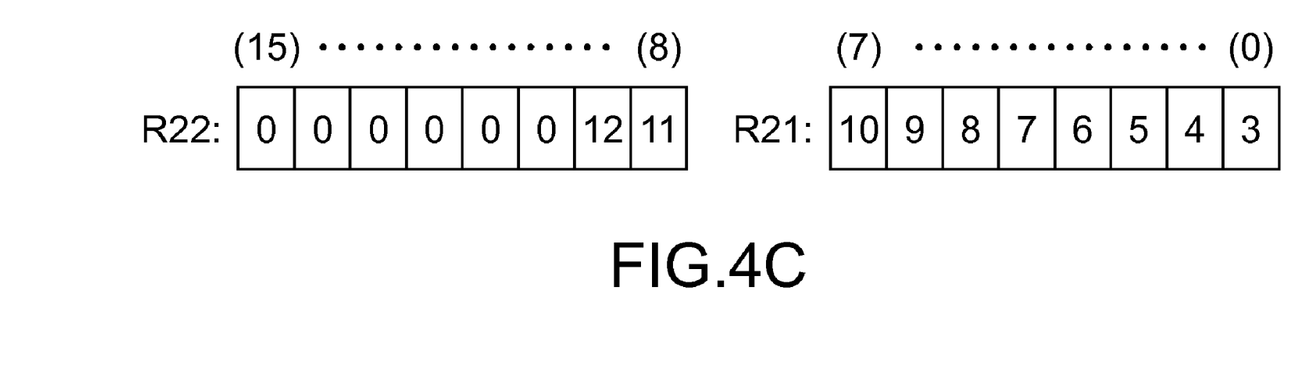

Hereinafter, an example is given with reference to the scheme of FIGS. 4A~4C for further understanding the embodiment mentioned above. First of all, it is predefined that each data unit includes 8 bits, and the bit range of the data to be read includes bits 3~12. The addresses of the bit range is originally distributed from address (3) to address (12) in two bytes B21 and B22 in the data storage zone, as shown in FIG. 4A, and need to be shifted to address (0)~(9) to obtain read data bytes R21 and R22, as shown in FIG. 4C. It is realized from the above assumption the following correlations, i.e.

m (bit number included in one data unit)=8,
n (bit number included in the defined bit range)=10,
a (address number of the starting data bit of the bit range)=3,
b (address number of the end data bit of the bit range)=12,
S1 (rightward shift amount)=mod[a, m]=mod[3, 8]=3,
S2 (leftward shift amount)=m−S1=8−3=5, and
MD (mask data)=0xFF>>(8−(b−a+1))=0xFF>>(−2)

Accordingly, the first byte B21 is processed by a rightward shift operation R1 to be shifted by the amount of 3 bits, and the second byte B22 is processed by a leftward shift operation L1 to be shifted by the amount of 5 bits to result in intermediate bytes T21 and T22. The bytes T21 and the bytes T22 are then synthesized via an OR gate operation to obtain a read data byte R21. Afterward, the second byte B22 comprising the end data bit 12 is also operated by the rightward shift operation R1 to result in an intermediate byte T23. The rightward shifted byte T23 including the end data bit 12 of the bit range then performs a masking procedure to clear the undesired bits 13, 14 and 15, thereby obtaining the last read data byte R22. The read data bytes R21 and R22 constitute the desired data. When the platform changes, the read data obtained according to the present invention can be stored according to desired byte endian.

The above embodiment and example illustrate the data reading procedure of the present data access method. On the other hand, the data writing procedure of the present data access method will be described herein with reference to the embodiment of FIG. 5 and the example of FIGS. 6A~6B.

Figure 5:
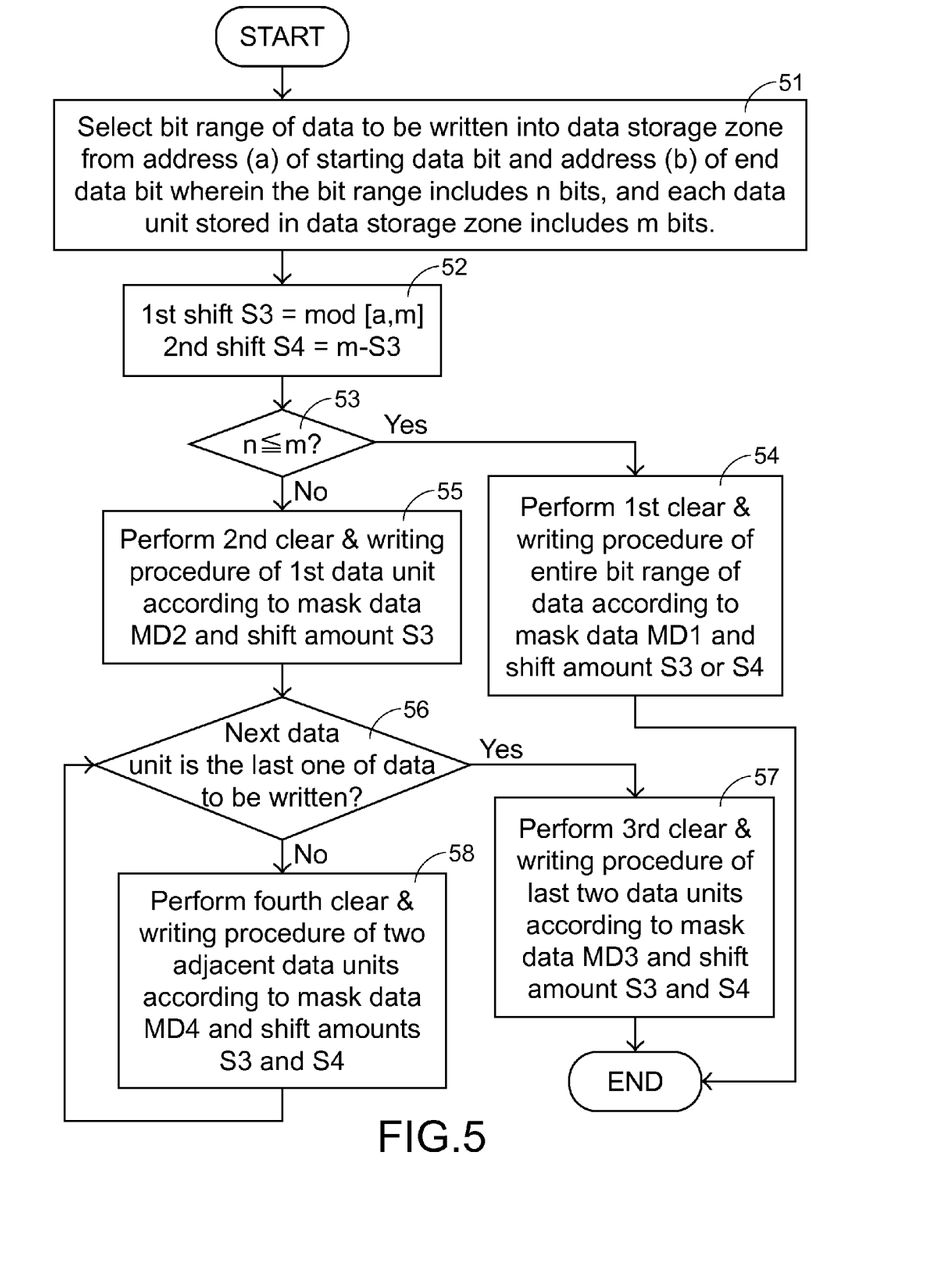
FIG. 5 is a flowchart illustrating an embodiment of a data writing procedure of the digital access method according to the present invention.

Please refer to the flowchart of FIG. 5. First of all, the bit range of data to be written into a data storage zone is determined, which for example, consists of n bits (Step 51). The data storage zone stores a plurality of data units as an array structure. The bit range of the data includes at least one data unit, which consists of m bits. The bit range of the data is to be stored in the addresses (a)~(b) in the data storage zone, where b=a+n−1. A first shift S3 and a second shift S4 are determined based on the address (a) of the starting data bit of the bit range (Step 52). The first shift S3 is calculated by a formula S3=mod[a, m] and the second shift S4 is calculated by a formula S4=m−S3. For example, if a byte consisting of 8 bits is used as the data unit, S3=mod[a, 8] and S4=8−S3.

The bit number n of the bit range is first compared with the bit number m of the data unit (Step 53). If n is less than or equal to m, i.e. n≦m, a first clear and writing procedure of the data to be written is performed according to the first or the second shift amount S3 or S4 (Step 54). The first clear and writing procedure includes a masking procedure for clearing the bits excluded from the data to be written into the data storage zone. The mask data MD1 used in this masking procedure are:

$$MD1=\sim((0xFF>>(7-b+a))<<S3),$$

where the expression "0xFF" indicates an 8-bit hexadecimal mask data and the 8 bits are all "1", the expression "X>>Y" indicates the rightward shift of the data X by Y bits, the expression "X<<Y" indicates the leftward shift of the data X by Y bits, and the expression "~Z" indicates the reverse logic operation of data Z. The first clear and writing procedure also includes a shift procedure for shifting the data to be written to the desired address range. The shift of the data is performed by the operation of ((data to be written & (0xFF>>(7−b+a)))<<S3), where the expression of "X & Y" indicates AND gate operation of data X and Y. Further, the first clear and writing procedure comprises a writing-in procedure implemented by an OR gate operation.

On the other hand, if n>m, Step 55 is performed for the first data unit of the data to be written in the data storage zone. That is, the first data unit is processed with a second clear and writing procedure. The second clear and writing procedure includes a masking procedure for clearing the bits excluded from the data to be written into the data storage zone. The mask data MD2 used in this masking procedure are:

$$MD2=\sim(0xFF<<S3).$$

The second clear and writing procedure also includes a shift procedure for shifting the data to be written to the desired address range. The shift of the data is performed by the operation of (data to be written<<S3). Further, the second clear and writing procedure comprises a writing-in procedure implemented by an OR gate operation.

After the first data unit is processed, it is determined whether next data unit is the last one (Step 56). If positive, the last and the last second data units are processed by a third clear and writing procedure according to the first and the second shifts S3 and S4 (Step 57). Otherwise, a fourth clear and writing procedure of two adjacent data units is performed according to the first and the second shifts S3 and S4 (Step 58). Step 58 will be performed until the last data unit has been processed by the third clear and writing procedure. The former and the latter ones of the two adjacent data units, for example, include lower and higher bits, respectively.

The third clear and writing procedure includes a masking procedure for clearing the bits excluded from the data to be written into the data storage zone. The mask data MD3 used in this masking procedure are:

$$MD3=0xFF<<(mod[b, m]+1),$$

where mod [b, m] is the remainder on division of b by m. The third clear and writing procedure also includes a shift procedure for shifting the data to be written to the desired address range. The shift of the data is performed by the operation of (last data unit to be written<<S3)|(last second data unit to be written>>S4) &~(0xFF<<(mod[b, m]+1)), where the expression "X|Y" indicates an OR gate logic operation of X with Y. Further, the second clear and writing procedure comprises a writing-in procedure implemented by an OR gate operation.

The fourth clear and writing procedure includes a shift procedure for shifting the data to be written to the desired address range. The shift of the data is performed by the operation of (latter data unit to be written<<S3)|(former data unit to be written>>S4). Further, the second clear and writing procedure comprises a writing-in procedure implemented by an OR gate operation.

Figure 6A:
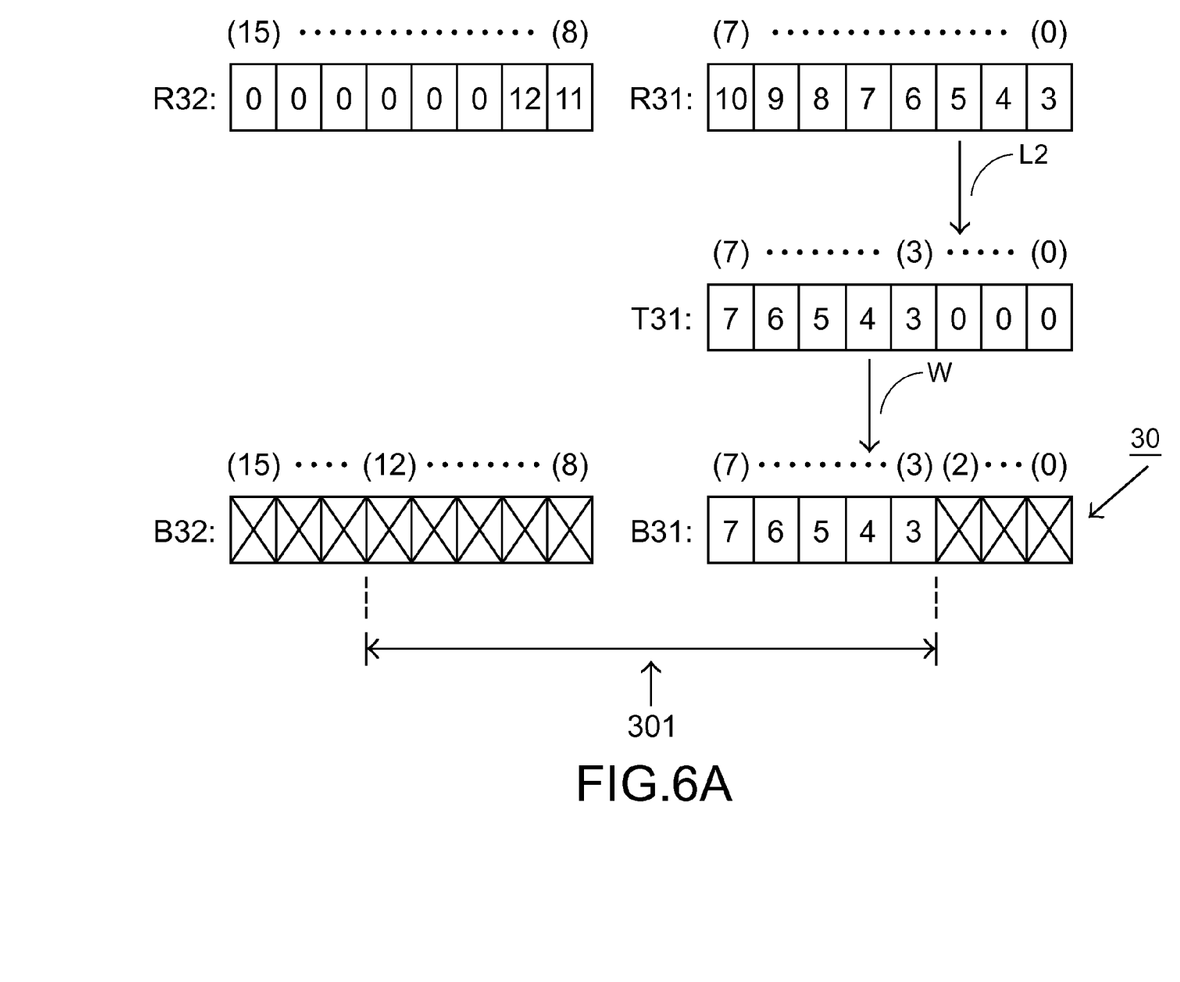
FIGS. 6A~6B are schematic diagrams showing the storage of data in a data storage zone according to the embodiment of FIG. 5.

Hereinafter, an example is given with reference to the scheme of FIGS. 6A and 6B for further understanding the above embodiment. First of all, it is predefined that each data unit includes 8 bits, and the bit range of the data to be written into the data storage zone includes bits 3~12. The addresses of the bit range to be stored in the data storage zone are distributed from address (3) to address (12) in two bytes B31 and B32. It is realized from the above assumption the following correlations, i.e.

m (bit number included in one data unit)=8,
n (bit number included in the defined bit range)=10,
a (address number of the starting data bit of the bit range)=3,
b (address number of the end data bit of the bit range)=12,
S3 (leftward shift amount)=mod[a, m]=mod[3, 8]=3,
S4 (rightward shift amount)=m−S3=8−3=5, and
MD 1 (mask data in the first clearing and writing procedure)=~((0xFF>>(7−b+a))<<S3)=~(0xFF>>(−2))<<3)
Shift of the data in the first clearing and writing procedure=((data to be written & (0xFF>>(7−b+a)))<<S3)= ((data to be written & (0xFF>>(−2)))<<3),
MD2 (mask data in the second clearing and writing procedure)=~(0xFF<<S3)=~(0xFF<<3)
Shift of the data in the second clearing and writing procedure=(data to be written<<S3)=(data to be written<<3),
MD3 (mask data in the third clearing and writing procedure)=0xFF<<(mod[b, m]+1)=0xFF<<5
Shift of the data in the third clearing and writing procedure=(last byte<<S3)|(last second byte>> S4)&~(0xFF<<(mod[b, m]+1))=(last byte<<3)|(last second byte>>5)&~(0xFF<<5)
Shift of the data in the fourth clearing and writing procedure=(latter byte<<S3)|(former byte>>S4)=(latter byte<<3)|(former byte>>5)

First of all, the bit number n is compared with the bit number m. Since n is greater than m in this example, the second clear and writing operation is performed. In other words, the masking procedure based on the mask data MD2 is performed first to clear the bits at the addresses (3)~(7) of the data storage zone 30, and the first byte R31 to be written into the data storage zone 30 is processed by a leftward shift operation L2 to be shifted by the amount of 3 bits, thereby obtaining an intermediate byte T31. The intermediate byte T31 is then written into the data storage zone 30 at the addresses (3)~(7) as data byte B31 via a writing procedure.

Figure 6B:
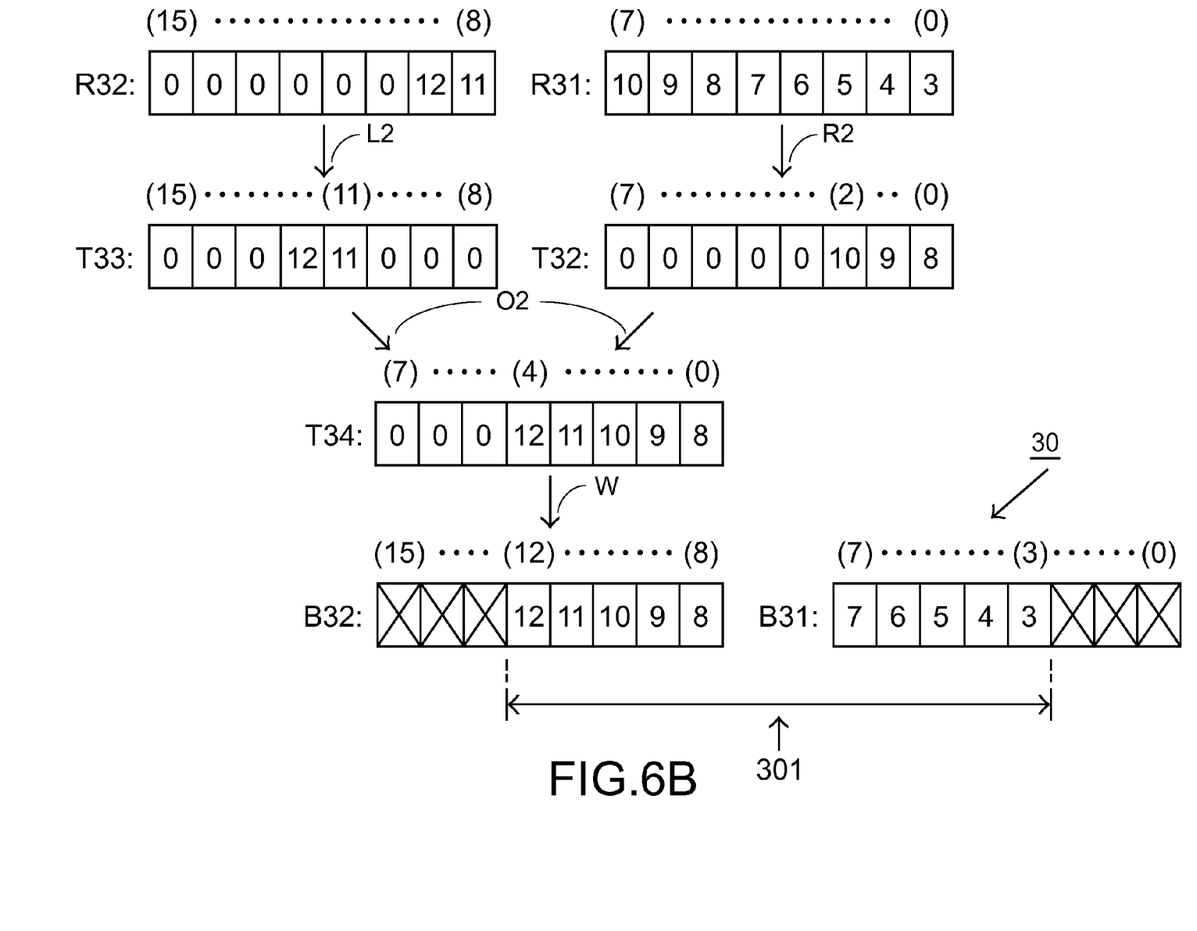

Further refer to FIG. 6B. Since the second byte R32 is the last byte to be written, the third clear and writing procedure is performed. In other words, the masking procedure based on the mask data MD3 is performed first to clear the bits at the addresses (8)~(12) of the data storage zone 30. Then, the first byte R31 is processed by a rightward shift operation R2 to be shifted by the amount of 5 bits, and the second byte R32 is processed by a leftward shift operation L2 to be shifted by the amount of 3 bits to result in intermediate bytes T32 and T33. The bytes T32 and the bytes T33 are then synthesized via an OR gate operation to obtain a data byte T34. The intermediate byte T34 is then written into the data storage zone 30 at the addresses (8)~(12) as data byte B32 via a writing procedure.

The first to fourth clear and writing procedures can be used with various byte endians so as to be suitable for various platforms. It is understood from the above description of embodiments and examples that the present data processing method can be flexibly applied to various platforms due to the use of variable mask data and shift amount.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A data access method, comprising a data reading procedure to read a data from a data storage zone wherein said data is stored in a bit range of said data storage zone covering at least one storage units, each storage unit of said data storage zone consisting of m bits, and said bit range consists of n bits from a starting bit address (a) to an end bit address (b), and said data reading procedure comprising steps of:
   i) performing a first operation of said starting bit address (a) to obtain a first shift S1;
   ii) performing a second operation of said starting bit address (a) to obtain a second shift S2;
   iii) performing a first shift operation of said data with said first shift S1 to obtain a first shifted data unit;
   iv) performing a second shift operation of said data with said second shift S2 to obtain a second shifted data unit;
   v) synthesizing said first and said second shifted data units to obtain a read data unit; and
   vi) repeating at least one of said steps iii), iv) and v) when n is greater than m;
   wherein said first and said second operations are performed by the following formulae:
   S1=mod[a, m]; and
   S2=m−mod[a, m]=m−S1,
   where mod [a, m] is the remainder on division of a by m.

2. The data access method according to claim 1 wherein said first shift operation is performed by shifting a first portion of said data stored in a first storage unit of said data storage zone toward one of the higher bit direction and the lower bit direction, and said second shift operation is performed by shifting a second portion of said data stored in a second storage unit of said data storage zone toward the other of the higher bit direction and the lower bit direction.

3. The data access method according to claim 2 wherein said second storage unit is immediately adjacent to said first storage unit in said data storage zone.

4. The data access method according to claim 3 wherein in said step (vi), only said step (iii) is repeated for shifting an end data unit comprising said end data bit address (b) with said first shift S1 to obtain a last shifted data unit.

5. The data access method according to claim 4 further comprising a step of masking said last shifted data unit with a mask data MD for clearing bits excluded from said bit range, where MD=0xFF>>(m−(b−a+1)), the expression "0xFF" indicates an 8-bit hexadecimal mask data and the 8 bits are all "1",and the expression "X>>Y" indicates the rightward shift of the data X by Y bits.

6. The data access method according to claim 1 wherein said first and said second shifted data units are synthesized via an OR gate operation.

7. A data access method, comprising a data writing procedure to write a data into a data storage zone, said data storage zone storing said data in a bit range covering at least one storage unit, each storage unit of said data storage zone consisting of m bits, said bit range consisting of n bits from a starting bit address (a) to an end bit address (b), and said data writing procedure comprising steps of:
   i) performing a first operation of said starting bit address (a) to obtain a first shift S3;
   ii) performing a second operation of said starting bit address (a) to obtain a second shift S4;
   iii) performing a first shift operation of said data with said second shift S4 to obtain a first shifted data unit;
   iv) performing a second shift operation of said data with said first shift S3 to obtain a second shifted data unit; and
   v) synthesizing said first and said second shifted data units to obtain a written data unit,
   wherein at least one of said steps iii), iv) and v) is preformed more than once when n is greater than m; and
   wherein said first and said second operations are performed by the following formulae:
   S3=mod [a, m]; and
   S4=m−mod [a, m]=m−S3,
   where mod [a, m] is the remainder on division of a by m.

8. The data access method according to claim 7 wherein said first shift operation is performed by shifting a first data unit of said data to be written toward one of the higher bit direction and the lower bit direction to obtain said first shifted data unit, and said second shift operation is performed by shifting a second data unit of said data to be written toward the other of the higher bit direction and the lower bit direction to obtain said second shifted data unit.

9. The data access method according to claim 8 wherein said second data unit is immediately adjacent to said first data unit in said data storage zone.

10. The data access method according to claim 9 further comprising steps of:
   determining whether said second data unit is the last data unit of said data to be written, wherein said first shifted data unit and said second shifted data unit are synthesized to obtain an end written data unit when said second data unit is the last data unit of said data to be written; and
   performing a masking procedure with a mask data MD3 for clearing bits of an end storage unit of said storage zone for storing said end written data unit when said second data unit is the last data unit of said data to be written, where MD3=0xFF<<(mod [b, m]+1), mod [b, m] is the remainder on division of b by m, the expression "0xFF" indicates an 8-bit hexadecimal mask data and the 8 bits are all "1", and the expression "X<<Y" indicates the leftward shift of the data X by Y bits.

11. The data access method according to claim 9 wherein said first and said second shift operations are further performed on subsequent data units until the last data unit of said data to be written has been shifted.

12. The data access method according to claim 8 further comprising before said step (iii) steps of:
   determining whether said first data unit is the starting data unit of said data to be written;
   performing a starting shifting operation of said first data unit with said first shift S3 to obtain a starting shifted data unit when said first data unit is the starting data unit of said data to be written; and performing a masking procedure with a mask data MD2 for clearing bits of a starting storage unit of said storage zone for storing said starting shifted data unit, where MD2=~(0xFF<<S3), the expression "0xFF" indicates an 8-bit hexadecimal mask data and the 8 bits are all "1", the expression "X<<Y" indicates the leftward shift of the data X by Y bits, and the expression "~Z" indicates the reverse logic operation of data Z.

13. The data access method according to claim 7 wherein said first and said second shifted data units are synthesized via an OR gate operation.

14. A data access method, comprising a data writing procedure to write a data into a data storage zone, said data storage zone storing data in a bit range covering at least one storage unit, each storage unit of said data storage zone consisting of m bits, said bit range consisting of n bits from a starting bit address (a) to an end bit address (b), and said data writing procedure comprising steps of:

performing a first clear and writing procedure of said data to be written when n is no greater than m, said first clear and writing procedure comprising a step of masking said bit range with a first mask data MD1=~((0xFF>>((m−1)−b+a))<<mod [a, m]); and performing a second clear and writing procedure and a third clear and writing procedure of said data to be written when n is greater than m, said second clear and writing procedure comprising a step of masking a starting storage unit with a second mask data MD2=~(0xFF<<mod [a, m]), and said third clear and writing procedure comprising a step of masking an end storage unit with a third mask data MD3=0xFF<<(mod [b, m]+1);

where the expression "0xFF" indicates a hexadecimal mask data, the expression "X>>Y" indicates the rightward shift of the data X by Y bits, the expression "X<<Y" indicates the leftward shift of the data X by Y bits, the expression "~Z" indicates the reverse logic operation of data Z, the expression "X & Y" indicates AND gate operation of data X and Y, the expression "mod [a, m]" indicates the remainder on division of a by m, and the expression "mod [b, m]" indicates the remainder on division of b by m.

15. The data access method according to claim 14 wherein said data writing procedure is performed as little endian.

16. The data access method according to claim 14 wherein said data writing procedure is performed as big endian.

17. The data access method according to claim 14 wherein when n is greater than m, the starting data unit of said data is shifted by a shift S3 and then written into said starting storage unit of said data storage zone in said second clear and writing procedure, where S3=mod [a, m] that is the remainder on division of a by m.

18. The data access method according to claim 14 wherein when n is greater than m, the last second data unit and the last data unit of said data are shifted by a first shift S3 and a second shift S4, respectively, and the differentially shifted data are synthesized and then written into said end storage unit in said third clear and writing procedure, where S3=mod [a, m] that is the remainder on division of a by m, and S4=m−S3.

* * * * *